(12) United States Patent  (10) Patent No.: US 9,131,190 B2
Matsubara  (45) Date of Patent: Sep. 8, 2015

(54) METHOD, DEVICE AND PROGRAM FOR CONTROLLING TRANSPARENCY OF AN IMAGE ON A DISPLAY SCREEN

(75) Inventor: Yoshiaki Matsubara, Tokyo (JP)

(73) Assignee: Sony Corporation (JP)

( * ) Notice: Subject to any disclaimer, the term of this patent is extended or adjusted under 35 U.S.C. 154(b) by 97 days.

(21) Appl. No.: 13/158,755

(22) Filed: Jun. 13, 2011

(65) Prior Publication Data

US 2011/0310123 A1 Dec. 22, 2011

(30) Foreign Application Priority Data

Jun. 22, 2010 (JP) ................ P2010-141453

(51) Int. Cl.
 H04N 5/45 (2011.01)
 H04N 5/445 (2011.01)
 H04N 21/431 (2011.01)
 H04N 21/443 (2011.01)

(52) U.S. Cl.
 CPC ............ *H04N 5/45* (2013.01); *H04N 5/44582* (2013.01); *H04N 21/4316* (2013.01); *H04N 21/4438* (2013.01)

(58) Field of Classification Search
 USPC ............................ 345/629–641; 715/781–783
 See application file for complete search history.

(56) References Cited

U.S. PATENT DOCUMENTS

| 5,892,511 | A * | 4/1999 | Gelsinger et al. ............. 715/794 |
| 6,246,407 | B1 * | 6/2001 | Wilks et al. .................... 715/803 |
| 6,333,753 | B1 * | 12/2001 | Hinckley ..................... 715/768 |
| 6,407,761 | B1 * | 6/2002 | Ching et al. .................. 715/835 |
| 6,670,970 | B1 * | 12/2003 | Bonura et al. ................ 715/768 |
| 6,954,905 | B2 * | 10/2005 | Brown et al. ................. 715/768 |
| 6,981,227 | B1 * | 12/2005 | Taylor .......................... 715/768 |
| 7,509,593 | B2 | 3/2009 | Kaminagayoshi |
| 7,853,891 | B2 * | 12/2010 | Chaudhri et al. ............ 715/781 |
| 7,956,869 | B1 * | 6/2011 | Gilra ............................ 345/592 |
| 2002/0070957 | A1 | 6/2002 | Trajkovic et al. |
| 2003/0120678 | A1 * | 6/2003 | Hill et al. ..................... 707/102 |
| 2003/0208751 | A1 | 11/2003 | Kim et al. |

(Continued)

FOREIGN PATENT DOCUMENTS

| CN | 101278555 A | 10/2008 |
| EP | 1404130 A1 | 3/2004 |

(Continued)

OTHER PUBLICATIONS

European Search Report EP 11169067, dated Sep. 19, 2011.

(Continued)

*Primary Examiner* — David Zarka
*Assistant Examiner* — Jason Pringle-Parker
(74) *Attorney, Agent, or Firm* — Lerner, David, Littenberg, Krumholz & Mentlik, LLP

(57) ABSTRACT

There is provided an image display device, including a first obtaining unit for obtaining a first image, a second obtaining unit for obtaining a second image to be superimposed on the first image, a reproducing unit for generating an output image by superimposing the second image on the first image and displaying the generated output image, a detecting unit for detecting a position in the output image of a cursor operated by a user, and a reproduction controller for controlling display of the second image by the reproducing unit according to positional relationship between a display position of the second image in the output image and a cursor position detected by the detecting unit.

14 Claims, 16 Drawing Sheets

(56) References Cited

U.S. PATENT DOCUMENTS

| | | | | |
|---|---|---|---|---|
| 2004/0179017 A1* | 9/2004 | Martyn et al. | | 345/536 |
| 2006/0259877 A1* | 11/2006 | Kaminagayoshi | | 715/858 |
| 2007/0226642 A1* | 9/2007 | Soulier | | 715/768 |
| 2007/0245256 A1* | 10/2007 | Boss et al. | | 715/768 |
| 2009/0295998 A1* | 12/2009 | Nobori et al. | | 348/565 |
| 2010/0164989 A1* | 7/2010 | Margalit et al. | | 345/629 |

FOREIGN PATENT DOCUMENTS

| | | |
|---|---|---|
| JP | 2001175378 A | 6/2001 |
| JP | 2006109281 A | 4/2006 |
| JP | 2006244078 A | 9/2006 |
| JP | 2009289180 A | 12/2009 |
| JP | 2010055627 A | 3/2010 |
| WO | 0193008 A1 | 12/2001 |
| WO | 0249351 A2 | 6/2002 |
| WO | 2007069824 A1 | 6/2007 |

OTHER PUBLICATIONS

Office Action from Japanese Application No. 2010-141453, dated Jan. 14, 2014.

Chinese Office Action for CN Application No. 201110160073.3, dated Feb. 4, 2015.

* cited by examiner

MOVEMENT OF CURSOR ONLY

PRESS OF PREDETERMINED BUTTON
+
MOVEMENT OF CURSOR

METHOD, DEVICE AND PROGRAM FOR CONTROLLING TRANSPARENCY OF AN IMAGE ON A DISPLAY SCREEN

CROSS-REFERENCE TO RELATED APPLICATION

The present application claims priority from Japanese Patent Application No. JP 2010-141453 filed in the Japanese Patent Office on Jun. 22, 2010, the entire content of which is incorporated herein by reference.

BACKGROUND

The present disclosure relates to an image display device, a display controlling method, and a program.

In related art, there is a technique referred to as a picture in picture (hereinafter, abbreviated as "PinP") for displaying a plurality of images or videos simultaneously on a screen of one display device. In the PinP, one or more sub-picture is superimposed on one main picture, for example, and the pictures are simultaneously displayed on the screen. There are a variety of contents of the main picture and the sub-picture such as a user interface image of a personal computer (PC), a video of a television program, and a video reproduced from a medium such as a Blu-ray Disc (BD™) or a DVD, for example.

In the PinP, a position on which the sub-picture is superimposed is typically specified by a user. For example, the user may decide or change the position of the sub-picture using a direction key of a remote controller of the display device. It is also possible to change setting of the display device using not the display device but a peripheral device of the computer connected to the display device by applying the technique disclosed in Japanese Patent Application Laid-Open No. 2001-175378. Further, as the technique related to the PinP, Japanese Patent Application Laid-Open No. 2009-289180 proposes to improve visibility of the main picture by making the sub-picture transparent when the user operates the position or a size of the sub-picture.

SUMMARY

However, especially when the user wants to operate an object (contents, menu or icon) displayed on the main picture, it is hard to say that operability of the user is sufficiently ensured only by using the methods disclosed in the above-described JP-A Nos. 2001-175378 and 2009-289180. For example, when the user wants to operate the object of the main picture behind the sub-picture, the user may correctly operate the object only after changing the position or the size of the sub-picture to display a desired object of the main picture. Such redundant operation itself is troublesome for the user. It is also possible that the user recognizes that there is no desired object of the main picture behind the sub-picture only after the user operates the sub-picture.

In light of the foregoing, it is desirable to provide a novel and improved image display device, display controlling method, and program capable of further improving the operability of the user in a composite screen display such as the PinP by resolving the above-described issue.

According to an embodiment of the present disclosure, there is provided an image display device, including a first obtaining unit for obtaining a first image, a second obtaining unit for obtaining a second image to be superimposed on the first image, a reproducing unit for generating an output image by superimposing the second image on the first image and displaying the generated output image, a detecting unit for detecting a position in the output image of a cursor operated by a user, and a reproduction controller for controlling display of the second image by the reproducing unit according to positional relationship between a display position of the second image in the output image and a cursor position detected by the detecting unit.

The reproduction controller may control the display of the second image according to a distance between the display position of the second image and the cursor position.

The reproduction controller may change transparency of the second image according to the distance between the display position of the second image and the cursor position.

The reproduction controller may make the second image transparent when the distance between the display position of the second image and the cursor position is smaller than a predetermined threshold.

The reproduction controller may increase the transparency of the second image as the distance becomes smaller when the distance between the display position of the second image and the cursor position is smaller than the predetermined threshold.

The detecting unit may be further capable of detecting a user input different from movement of the cursor, and the reproduction controller may not make the second image transparent regardless of the cursor position when the user input is detected.

The detecting unit may be further capable of detecting a user input different from movement of the cursor, and the reproduction controller may not make the second image transparent regardless of the cursor position when the user input is not detected.

The reproduction controller may move the second image to another position in the output image when the distance between the display position of the second image and the cursor position is 0 or smaller than a predetermined threshold.

The second obtaining unit may further obtain an audio signal associated with the second image, the reproducing unit may reproduce the audio signal obtained by the second obtaining unit, and the reproduction controller may further control reproduction of the audio signal by the reproducing unit according to the positional relationship.

The reproduction controller may not allow the reproducing unit to reproduce the audio signal when a distance between the display position of the second image and the cursor position is larger than a predetermined threshold.

According to another embodiment of the present disclosure, there is provided a display controlling method, including obtaining a first image, obtaining a second image to be superimposed on the first image, generating an output image by superimposing the second image on the first image, displaying the generated output image, detecting a position in the output image of a cursor operated by a user, and controlling display of the second image in the output image according to positional relationship between a display position of the second image in the output image and a detected cursor position.

According to another embodiment of the present disclosure, there is provided a program for allowing a computer for controlling an image display device for displaying an output image generated by superimposing a second image on a first image to serve as a first obtaining unit for obtaining the first image, a second obtaining unit for obtaining the second image, a detecting unit for detecting a position in the output image of a cursor operated by a user, and a reproduction controller for controlling display of the second image in the output image according to positional relationship between a display position of the second image in the output image and a cursor position detected by the detecting unit.

As described above, according to the image display device, the display controlling method, and the program according to an embodiment of the present disclosure, the operability of the user in the composite screen display such as the PinP may be further improved.

DETAILED DESCRIPTION OF THE EMBODIMENT

Figure 1:
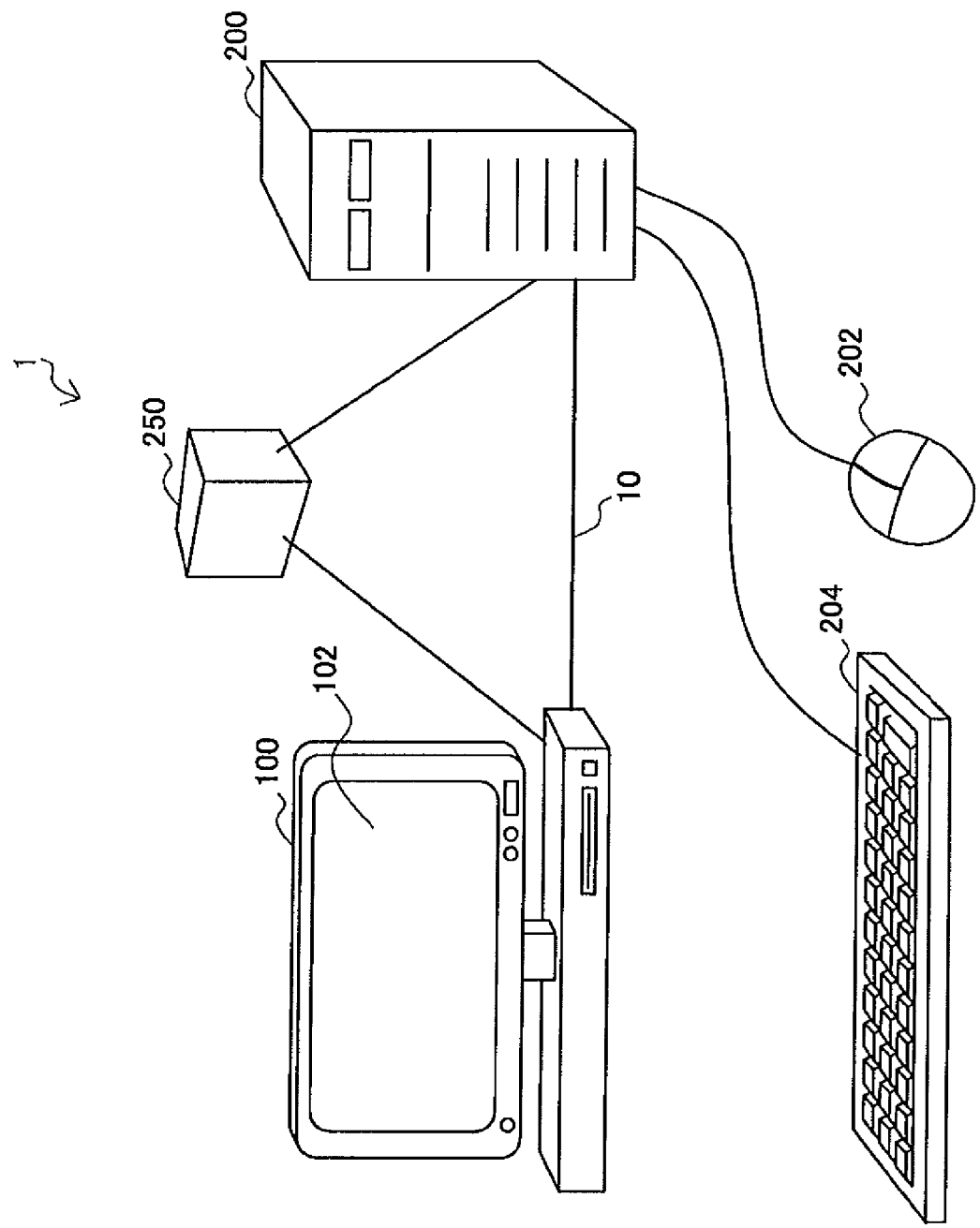
FIG. 1 is a schematic diagram of an outline of a display control system according to one embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the "detailed description of the embodiment" is described in a following order.

1. Outline of Display Control System
2. Configuration Example of Device according to One Embodiment
   2-1. Hardware Configuration of Image Display Device
   2-2. Hardware Configuration of Control Device
   2-3. Logical Configuration
3. Example of Control Scenario
   3-1. Positional Relationship
   3-2. First Scenario
   3-3. Variation
   3-4. Second Scenario
   3-5. Third Scenario
4. Summary

1. Outline of Display Control System

FIG. 1 is a schematic diagram of an outline of a display control system 1 according to one embodiment of the present disclosure. With reference to FIG. 1, the display control system 1 includes an image display device 100 and a control device 200 connected to each other by a connecting line 10. The image display device 100 has a screen 102 for displaying an image. The control device 200 is connected to a pointing device 202 and a keyboard 204 as an example of an input means for receiving a user input. The image display device 100 and the control device 200 may further be connected to a network device 250.

The connecting line 10 is a communication line, which enables communication between the image display device 100 and the control device 200. The connecting line 10 may be a multimedia output line, which complies with a high-definition multimedia interface (HDMI) standard specification, for example. Alternatively, the connecting line 10 may be the communication line of another type such as a universal serial bus (USB) and an Ethernet™, for example. Further, the connecting line 10 may be realized not by wired communication but by high-speed wireless communication such as an ultra wide band (UWB) wireless, for example.

The image display device 100 is a device that displays an output image obtained by superimposing a plurality of images on the screen 102. Therefore, the output image displayed by the image display device 100 includes at least a first image and a second image. In this specification, the first image (or a display region thereof) and a second image (or a display region thereof) displayed on the screen 102 are sometimes referred to as a main picture and a sub-picture, respectively. The main picture and the sub-picture form a so-called PinP. However, it should be understood that a composite screen referred to by a name different from the PinP may also be included in the scope of the present disclosure. As is to be described in detail later, display of the images by the image display device 100 is controlled by means of the control device 200 according to operation by a user.

The first image and the second image may be obtained from a source inside the image display device 100 or may be obtained from a source outside the image display device 100. The source inside the image display device 100 may include a video output from a recording medium such as a hard disk and a BD incorporated in the image display device 100, for example. Also, the source outside the image display device 100 may include the video output from the control device 200, the video output from an AV recorder (not illustrated), delivery from a streaming server, and a television broadcasting, for example.

Meanwhile, an example in which the image display device 100 is a television receiver is mainly described in this specification. However, alternatively, the image display device 100 may be a monitor for a personal computer (PC), a contents player having a screen, and a display device of another type, for example.

The control device 200 is a device for controlling the display of the composite image by the image display device 100 according to the operation by the user. The control device 200 detects an operation event generated in the pointing device 202 or the keyboard 204, for example. Then, the control device 200 transmits the detected operation event to the image display device 100 through the connecting line 10. The operation event transmitted from the control device 200 to the image display device 100 may include movement of a cursor, drag and click by the pointing device 202, and press of buttons (or keys) of various types in the keyboard 204, for example.

Also, the control device 200 may output the video to the image display device 100. For example, when the control device 200 is the PC, the video, which shows a desktop screen of the PC or a screen of an application operating on the PC, may be output from the control device 200 to the image display device 100. In this case, the output video from the control device 200 also includes an image of the cursor operated by the pointing device 202. On the other hand, when the video is not output from the control device 200 to the image display device 100, the image of the cursor operated by the pointing device 202 may be generated by the image display device 100.

Meanwhile, in this specification, an example in which the control device 200 is the PC connected to the pointing device 202 and the keyboard 204 is mainly described. However, as the pointing device 202, a touch pad, a pointing stick, a track ball and the like may be used in place of a mouse illustrated in FIG. 1. Also, the keyboard 204 may be omitted from a configuration of the display control system 1. Further, the control device 200 may be a game device, a digital household electrical appliance and the like having a controller as the input means, for example, in place of the PC.

The network device 250 is a device with which the image display device 100 and the control device 200 access to an external network. The network device 250 may be a modem, a digital service unit (DSU), a broadband router, a wireless access point and the like, for example. The image display device 100 may receive video contents from a contents server through the network device 250, for example.

2. Configuration Example of Device According to One Embodiment

Next, an example of specific configurations of the image display device 100 and the control device 200 of the display control system 1 is illustrated with reference to FIGS. 2 to 5.

2-1. Hardware Configuration of Image Display Device

Figure 2:
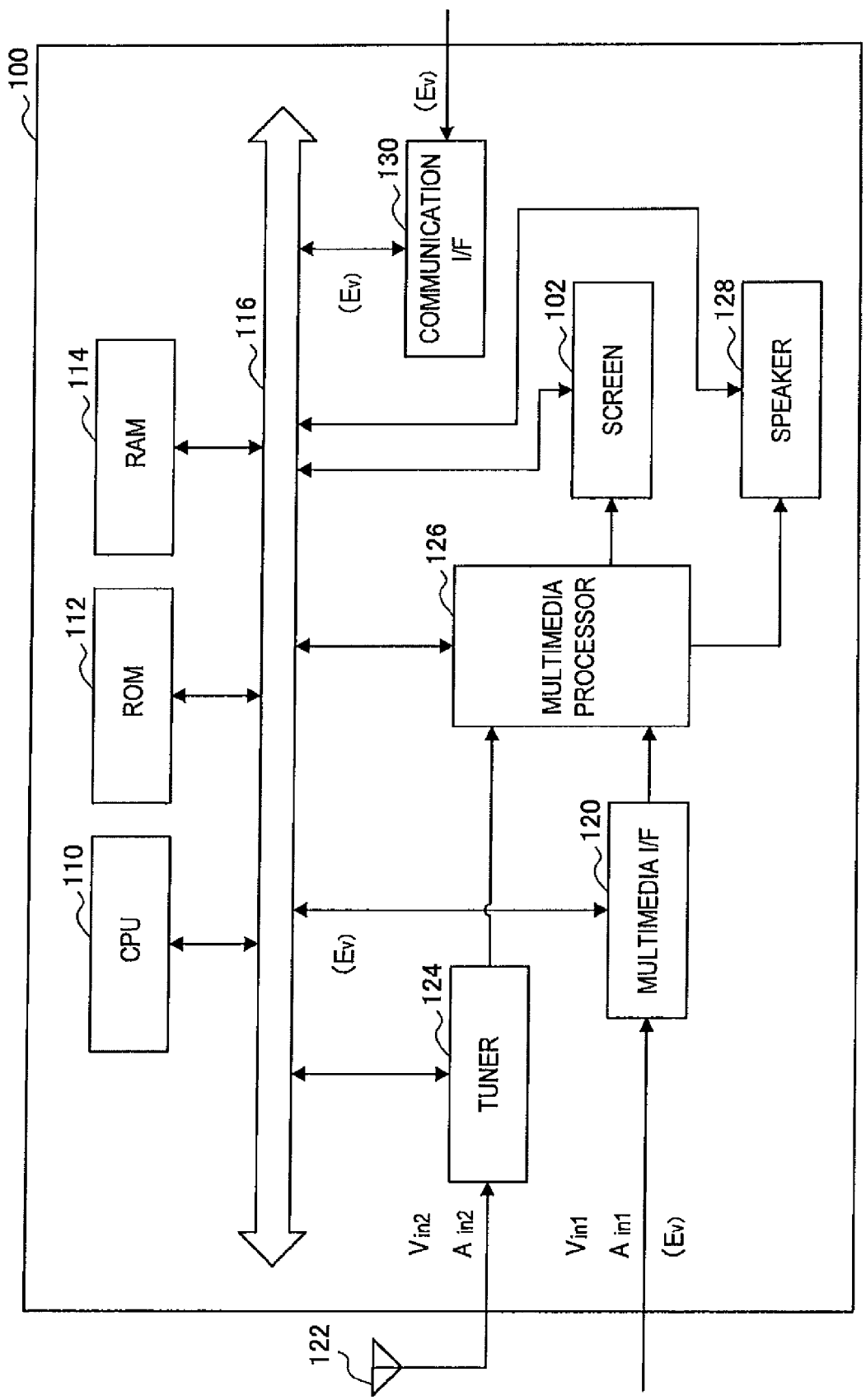
FIG. 2 is a block diagram of an example of a hardware configuration of an image display device according to one embodiment.

FIG. 2 is a block diagram of an example of a hardware configuration of the image display device 100 according to this embodiment. With reference to FIG. 2, the image display device 100 is provided with a central processing unit (CPU) 110, a read only memory (ROM) 112, a random access memory (RAM) 114, a bus 116, a multimedia interface (I/F) 120, a tuner 124, a multimedia processor 126, the screen 102, a speaker 128, and a communication I/F 130.

The CPU 110 controls entire operation of the image display device 100. A program and data for controlling the operation of the image display device 100 are stored in the ROM 112. The RAM 114 temporarily stores the program and the data at the time of execution of a process by the CPU 110. The bus 116 connects the CPU 110, the ROM 112, and the RAM 114 to one another. The multimedia I/F 120, the tuner 124, the multimedia processor 126, the screen 102, the speaker 128, and the communication I/F 130 are further connected to the bus 116.

The multimedia I/F 120 receives a video signal $V_{in1}$ output from the control device 200 through the connecting line 10. The multimedia I/F 120 may be an interface, which complies with the HDMI standard specification, an USB interface and the like, for example. Also, the multimedia I/F 120 may receive an audio signal $A_{in1}$ associated with the video signal $V_{in1}$ in addition to the video signal $V_{in1}$ output from the control device 200. Then, the multimedia I/F 120 outputs the received video signal $V_{in1}$ and audio signal $A_{in1}$ to the multimedia processor 126.

The tuner 124 is connected to the antenna 122 to receive a video signal $V_{in2}$ through the antenna 122. Also, the tuner 124 may receive an audio signal $A_{in2}$ associated with the video signal $V_{in2}$ in addition to the video signal $V_{in2}$ through the antenna 122. Then, the tuner 124 outputs the received video signal $V_{in2}$ and audio signal $A_{in2}$ to the multimedia processor 126.

The multimedia processor 126 decodes the video signal input from the multimedia I/F 120, the tuner 124 or the communication I/F 130 to reproduce a series of images included in the video signal. Also, the multimedia processor 126 has a so-called PinP function for generating the output image by superimposing a plurality of reproduced images to display the generated output image on the screen 102. The multimedia processor 126 may change transparency and a display position of the image to be superimposed under control by the CPU 110. Further, the multimedia processor 126 decodes the audio signal input from the multimedia I/F 120, the tuner 124 or the communication I/F 130 to reproduce audio and outputs the reproduced audio to the speaker 128. The multimedia processor 126 may change a volume of the reproduced audio or switch an audio input under the control by the CPU 110.

The communication I/F 130 mediates communication between the image display device 100 and another device. The communication I/F 130 may be a wired local area network (LAN) or a wireless LAN interface, for example.

The multimedia I/F 120 or the communication I/F 130 receives an operation event Ev transmitted from the control device 200 to the image display device 100. Then, the operation event Ev received by the multimedia I/F 120 or the communication I/F 130 is processed by the CPU 110 as is to be further described later.

The operation event Ev may be transmitted from the control device 200 to the image display device 100 by any of following methods, for example. Meanwhile, the methods of transmitting the event herein described are illustrative only and another method may also be used.

Method 1: Event information (typically including a code indicating a type of operation and a positional coordinate of the cursor) is described in a partition for expansion included in an "AVIINFO frame" field of a HDMI signal format.

Method 2: The event information is described in a partition for expansion of consumer electronics control (CEC) being a control channel supported by a HDMI version 1.2a or newer.

Method 3: An IP packed including the event information as data is transferred through an Ethernet channel supported by a HDMI version 1.4 or a general LAN line.

2-2. Hardware Configuration of Control Device

Figure 3:
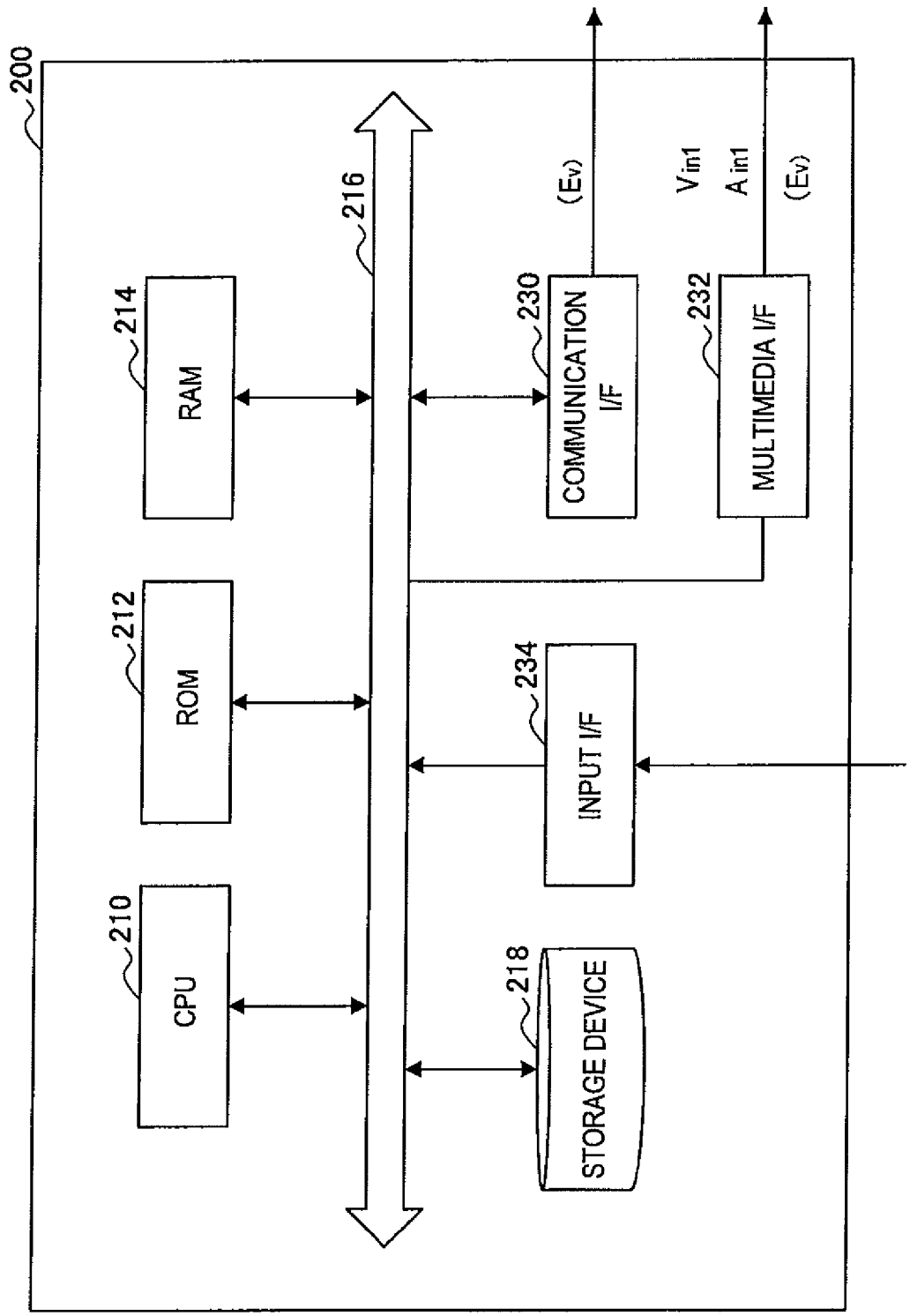
FIG. 3 is a block diagram of an example of a hardware configuration of a control device according to one embodiment.

FIG. 3 is a block diagram of an example of a hardware configuration of the control device 200 according to this embodiment. With reference to FIG. 3, the control device 200 is provided with a CPU 210, a ROM 212, a RAM 214, a bus 216, a storage device 218, a communication I/F 230, a multimedia I/F 232, and an input I/F 234.

The CPU 210 controls entire operation of the control device 200. A program and data for controlling the operation of the control device 200 are stored in the ROM 212. The RAM 214 temporarily stores the program and the data at the time of execution of a process by the CPU 210. The bus 216 connects the CPU 210, the ROM 212, and the RAM 214 to one another. The storage device 218, the communication I/F 230, the multimedia I/F 232, and the input I/F 234 are further connected to the bus 216.

The storage device 218 is realized using a storage medium such as the hard disk and a semiconductor memory. The storage device 218 stores an operating system (OS), which operates on the control device 200, and a program for an application. Further, the storage device 218 may store the contents data including the video and the audio.

The communication I/F 230 mediates the communication between the control device 200 and another device. The communication I/F 230 may be the wired LAN or the wireless LAN interface, for example.

The multimedia I/F 232 transmits the video signal $V_{in1}$ generated by the CPU 210 to the image display device 100 through the connecting line 10. The video signal $V_{in1}$ generated by the CPU 210 may be a series of image signals, which represent the desktop screen or the application screen, or may be the video signal decoded from the contents data stored in the storage device 218, for example. Also, the multimedia I/F 232 may transmit the audio signal $A_{in1}$ associated with the video signal $V_{in1}$ in addition to the video signal $V_{in1}$.

The input I/F 234 includes one or more connecting terminal connected to the pointing device 202 and the keyboard 204. The operation event generated in the pointing device 202 or the keyboard 204 is detected through the input I/F 234 by an event listener, which operates on the CPU 210. Then, the CPU 210 transmits the detected operation event Ev to the image display device 100 through the communication I/F 230 or the multimedia I/F 232. Also, the operation event, which should be processed by the control device 200, is processed by an event handler, which operates on the CPU 210.

2-3. Logical Configuration

Figure 4:
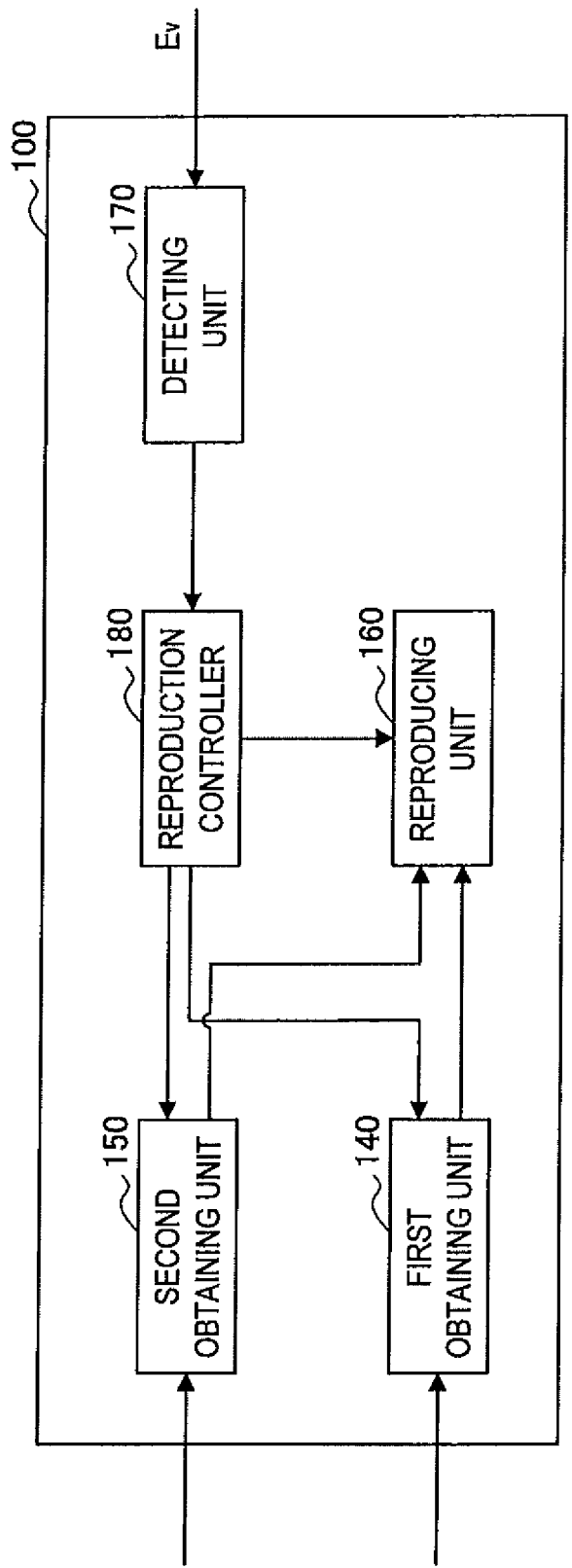
FIG. 4 is a block diagram of an example of a logical configuration of the image display device according to one embodiment.

FIG. 4 is a block diagram of an example of a logical configuration of the image display device 100 according to this embodiment. With reference to FIG. 4, the image display device 100 is provided with a first obtaining unit 140, a second obtaining unit 150, a reproducing unit 160, a detecting unit 170, and a reproduction controller 180.

First Obtaining Unit

The first obtaining unit 140 obtains the first image for forming the main picture in the output image, which should be output on the screen 102 of the image display device 100. In a scenario to be described later, the first image is an image included in the video signal $V_{in1}$ received from the control device 200 by the multimedia I/F 120. Therefore, the first image also includes the image of the cursor operated by the pointing device 202. Then, the first obtaining unit 140 outputs the obtained first image to the reproducing unit 160. Also, when the audio signal associated with the first image is input, the first obtaining unit 140 further obtains the audio signal (for example, the audio signal $A_{in1}$) to output to the reproducing unit 160.

Second Obtaining Unit

The second obtaining unit 150 obtains the second image for forming the sub-picture in the output image, which should be output on the screen 102 of the image display device 100. The second image is the image superimposed on the first image in the output image. In the scenario to be described later, the second image is an image included in the video signal $V_{in2}$ received by the tuner 124 through the antenna 122. Then, the second obtaining unit 150 outputs the obtained second image to the reproducing unit 160. Also, the second obtaining unit 150 further obtains the audio signal associated with the second image (for example, the audio signal $A_{in2}$) to output to the reproducing unit 160.

Reproducing Unit

The reproducing unit 160 generates the output image by superimposing the second image on the first image and displays the generated output image on the screen 102. The reproducing unit 160 makes the second image transparent with the transparency set by the reproduction controller 180 to superimpose the second image on the first image when generating the output image. Also, the reproducing unit 160 displays the second image on the display position in the output image decided by the reproduction controller 180. Also, the reproducing unit 160 may reproduce the audio signal obtained by the first obtaining unit 140 or the audio signal obtained by the second obtaining unit 150 or both of them using the speaker 128.

Detecting Unit

The detecting unit 170 detects a position in the output image of the cursor operated by the user. More specifically, the detecting unit 170 monitors the operation event Ev received from the control device 200 through the communication I/F 230 or the multimedia I/F 232. Then, the detecting unit 170 detects the operation event Ev received after generation of the event. The operation event Ev includes the code indicating the type of the operation and the positional coordinate of the cursor, for example, as the event information. In this embodiment, the code, which indicates the type of the operation, includes at least the code, which indicates the movement of the cursor (for example, "MouseMoved" and the like). That is to say, the detecting unit 170 detects the operation event Ev including the code, which indicates the movement of the cursor, and according to this, the image display device 100 may recognize the operation by the user who intends to move the cursor. The detecting unit 170 is also capable of detecting the operation event including the code different from the code, which indicates the movement of the cursor. Such operation event includes the press, and release of the button provided on the pointing device 202 or the keyboard 204, for example.

Reproduction Controller

The reproduction controller 180 controls display of the second image by the reproducing unit 160 according to positional relationship between the display position of the second image in the output image and the cursor position detected by the detecting unit 170. More specifically, in this embodiment, the reproduction controller 180 controls the display of the second image by the reproducing unit 160 according to a distance between the display position of the second image and the cursor position. A display parameter of the second image controlled by the reproduction controller 180 includes the transparency and the display position of the second image, for example. Also, the reproduction controller 180 may further control the reproduce of the audio signal by the reproducing unit 160 according to the positional relationship between the display position of the second image and the cursor position.

Example of Output Image

Figure 5:
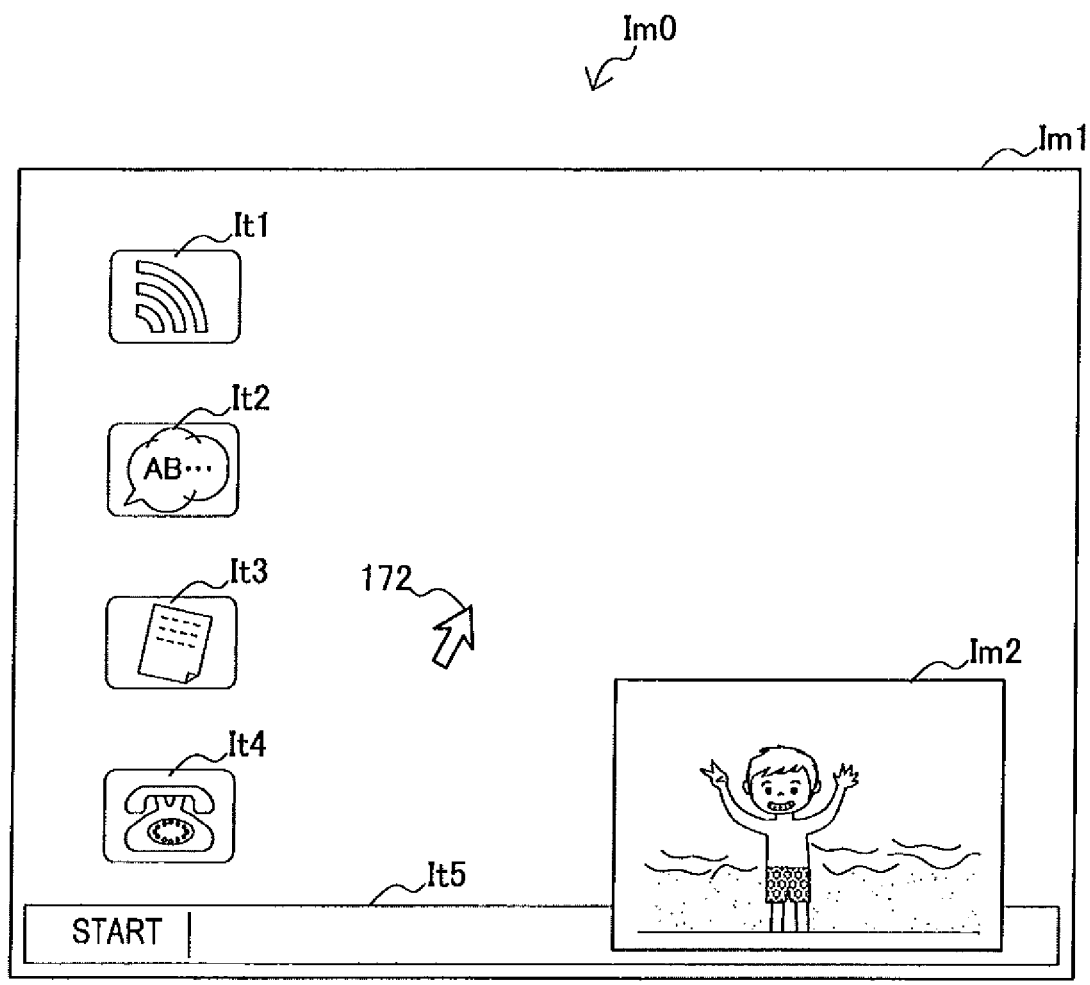
FIG. 5 is an illustrative diagram of an example of an output image displayed by the image display device according to one embodiment.

FIG. 5 is an illustrative diagram of an output image Im0 as an example displayed by the image display device 100. With reference to FIG. 5, the output image Im0 is an image obtained by superimposing a second image Im2 on a first image Im1. In the example in FIG. 5, the first image Im1 is an image of a desktop of the PC received from the control device 200. The first image Im1 includes icons It1, It2, It3, and It4, and a menu bar It5. Also, the second image Im2 is an image, which displays one scene of a video of a certain television program. Further, a cursor 172 is displayed in the output image Im0.

In the output image Im0 in FIG. 5, the transparency of the second image Im2 is 0. Therefore, the user is not able to visually recognize what is displayed in the first image Im1 behind the second image Im2, for example. An object such as the icon or menu, which the user intends to operate, for example, might be hidden behind the second image Im2. In such a situation, when the user wants to operate the hidden object, if the user has to change the display position or a size of the second image to display a desired object before operating the object, such redundant operation is troublesome for the user. Also, it is possible that the user recognizes that the desired object is not present behind the second image Im2 only after performing the redundant operation. Then, the reproduction controller 180 of the image display device 100 according to this embodiment improves above-described disadvantage of usability by controlling the display of the second image as in an illustrative scenario to be described in a following section.

3. Example of Control Scenario 3-1. Positional Relationship

As described above, the reproduction controller 180 controls the display of the second image by the reproducing unit 160 according to the positional relationship between the display position of the second image in the output image and the cursor position detected by the detecting unit 170. In the scenario described in this section, the positional relationship between the display position of the second image and the cursor position detected by the detecting unit 170 is represented by the distance between the display position of the second image and the cursor position. The distance between the display position of the second image and the cursor position may be a direct distance between a reference point in the second image and the cursor position, for example.

More specifically, for example, a cursor position $P_{cur}$ in a coordinate system (X,Y) of the output image is defined as follows.

$$P_{cur}=(X_{cur}, Y_{cur}) \quad (1)$$

Also, a coordinate $P_{pic\_lt}$ of an upper left corner and a coordinate $P_{pic\_rb}$ of a lower right corner of the second image are defined as follows.

$$P_{pic\_lt}=(X_{left}, Y_{top}) \quad (2)$$

$$P_{pic\_rb}=(X_{right}, Y_{bottom}) \quad (3)$$

For example, when a reference point $P_{pic}$ in the second image is a point located the closest to the cursor position in the second image, the reference point $P_{pic}$ is given as follows. Meanwhile, suppose that an original point of the coordinate system (X,Y) of the output image is located on the upper left corner of the output image.

$$P_{pic} = (X_{pic}, Y_{pic}) \quad (4)$$

$$X_{pic} = \begin{cases} X_{left} & (X_{cur} \leq X_{left}) \\ X_{cur} & (X_{left} < X_{cur} < X_{right}) \\ X_{right} & (X_{right} \leq X_{cur}) \end{cases} \quad (5)$$

$$Y_{pic} = \begin{cases} Y_{top} & (Y_{cur} \leq Y_{top}) \\ Y_{cur} & (Y_{top} < Y_{cur} < Y_{bottom}) \\ Y_{bottom} & (Y_{bottom} \leq Y_{cur}) \end{cases} \quad (6)$$

Alternatively, the reference point $P_{pic}$ may be a center point of the second image or the corner the closest to the cursor position out of four corners of the second image.

A distance D between the display position of the second image and the cursor position is calculated by a following equation.

$$D=\sqrt{(X_{cur}-X_{pic})^2+(Y_{cur}-Y_{pic})^2} \quad (7)$$

Figure 6:
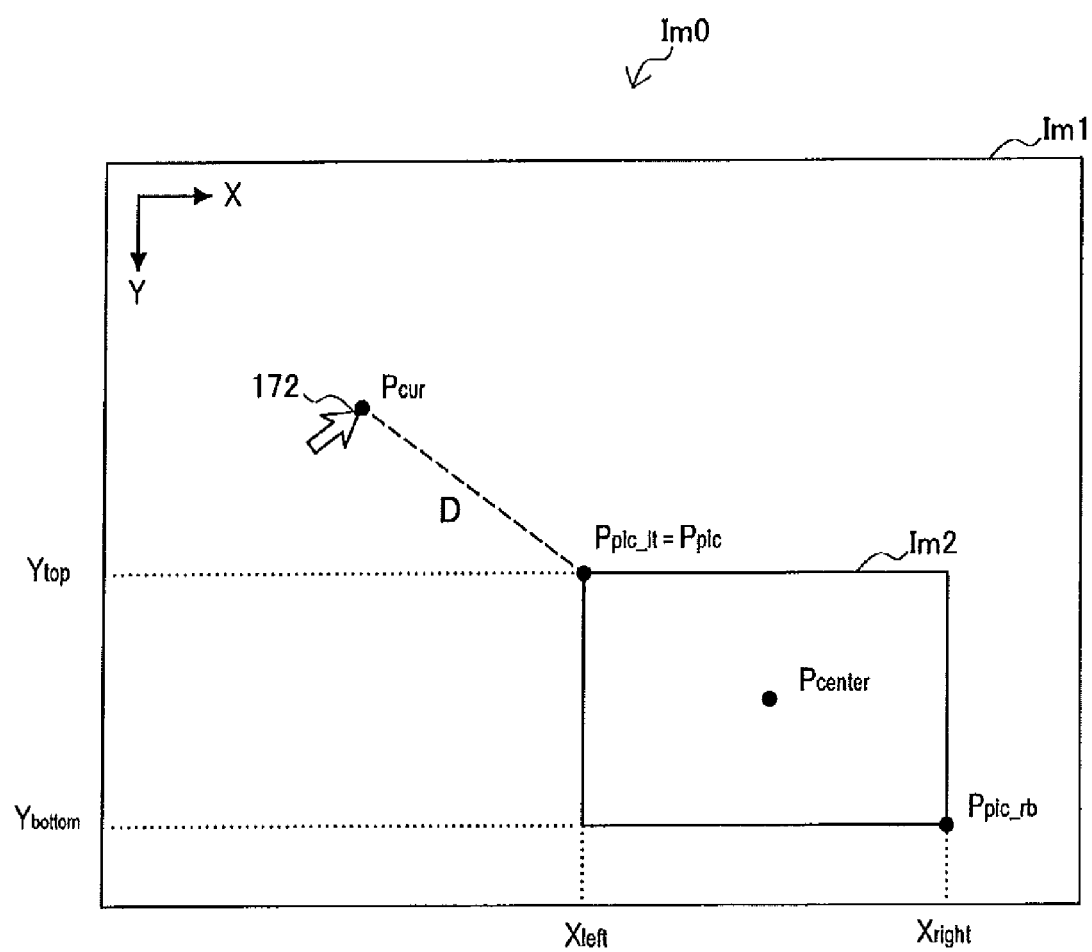
FIG. 6 is an illustrative diagram of an example of a distance between a display position of a second image and a cursor position.

FIG. 6 is an illustrative diagram of an example of the distance between the display position of the second image and the cursor position. In the example in FIG. 6, since the cursor 172 is located on an upper left portion of the second image Im2, the reference point $P_{pic}$ conforms to the upper left corner $P_{pic\_lt\_}$ of the second image. Therefore, the distance D between the display position of the second image and the cursor position equals to a direct distance between the cursor position $P_{cur}$ and the corner $P_{pic\_lt\_}$.

The reproduction controller 180 calculates the distance D between the display position of the second image and the cursor position according to the above-described equation, for example, and controls the display of the second image by the reproducing unit 160 according to the calculated distance D.

Meanwhile, the positional relationship between the display position of the second image and the cursor position may be represented by a parameter different from the above-described distance D. For example, on the assumption that the screen 102 is divided into a plurality of partial regions, the display of the second image may be controlled according to a type of combination of the partial region to which the display position of the second image belongs and the partial region to which the cursor position belongs (for example, whether they are the same partial region or the different partial regions).

3-2. First Scenario

In a first scenario, the reproduction controller 180 changes the transparency of the second image according to the distance D between the display position of the second image and the cursor position. More specifically, the reproduction controller 180 makes the second image transparent when the distance D is smaller than a predetermined threshold, for example. Also, the reproduction controller 180 increases the transparency of the second image as the distance D becomes smaller when the distance D is smaller than the predetermined threshold.

Figure 7:
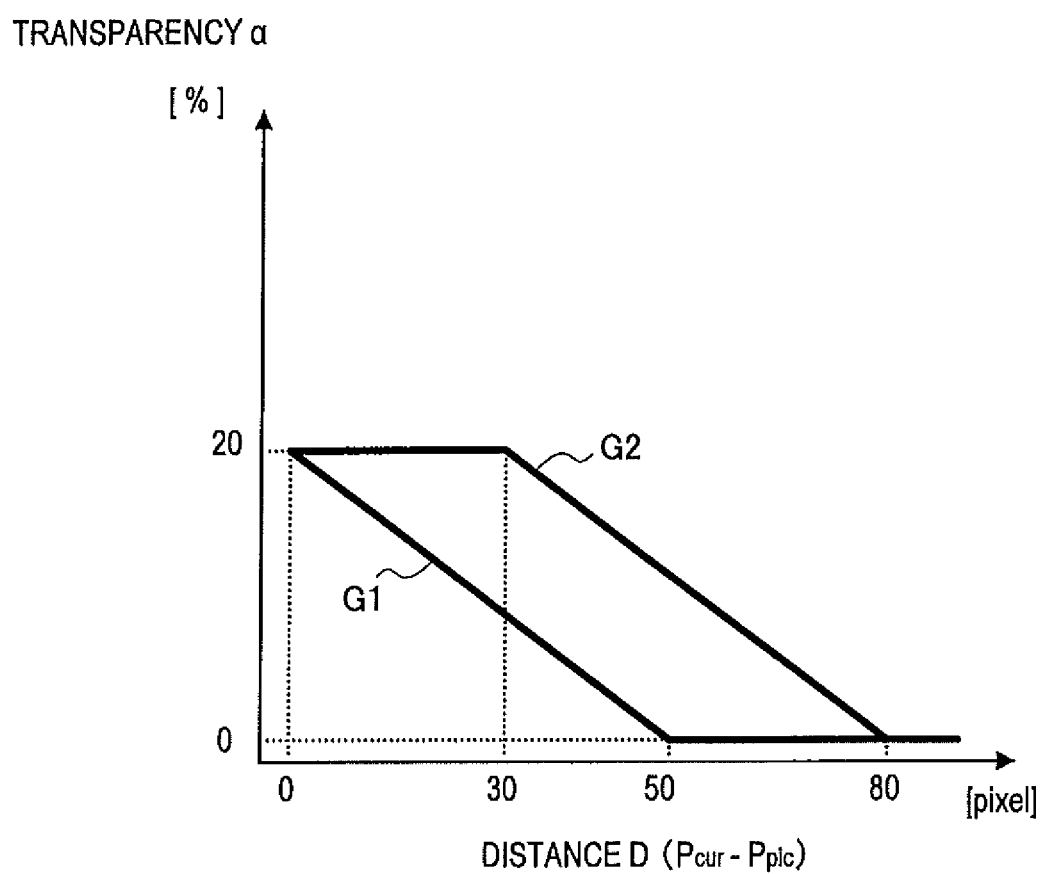
FIG. 7 is an illustrative diagram for illustrating transparency according to the distance between the display position of the second image and the cursor position.

FIG. 7 is an illustrative diagram for illustrating the transparency according to the distance between the display position of the second image and the cursor position. With reference to FIG. 7, two examples of a transparency decision graph in which the distance D is represented along an abscissa axis and transparency α is represented along a longitudinal axis are illustrated. A unit of the distance D along the abscissa axis is a number of pixels (pixel) and a unit of the transparency α along the longitudinal axis is percent (%).

According to a graph G1, when the distance D=0, the transparency α=20, and when the distance D=50, the transparency α=0. While the distance D changes from 0 to 50, the transparency α linearly decreases from 20 to 0. When the distance D is larger than 50, the transparency α is typically 0. Such transparency decision graph G1 means that the second image is transparent when the cursor is located in the vicinity of the second image and the transparency thereof increases as the cursor moves closer to the second image. On the other hand, according to a graph G2, when the distance D satisfies 0≤D<30, the transparency α=20, and when the distance D=80, the transparency α=0. While the distance D changes from 30 to 80, the transparency α linearly decreases from 20 to 0. When the distance D is larger than 80, the transparency α is typically 0. Meanwhile, the transparency decision graphs are illustrative only. That is to say, the reproduction controller 180 may set the transparency α according to the distance D in accordance with another threshold, another inclination of transparency, or another transparency decision graph. Also, the image display device 100 may allow the user to set the transparency decision graph in advance.

Figure 8:
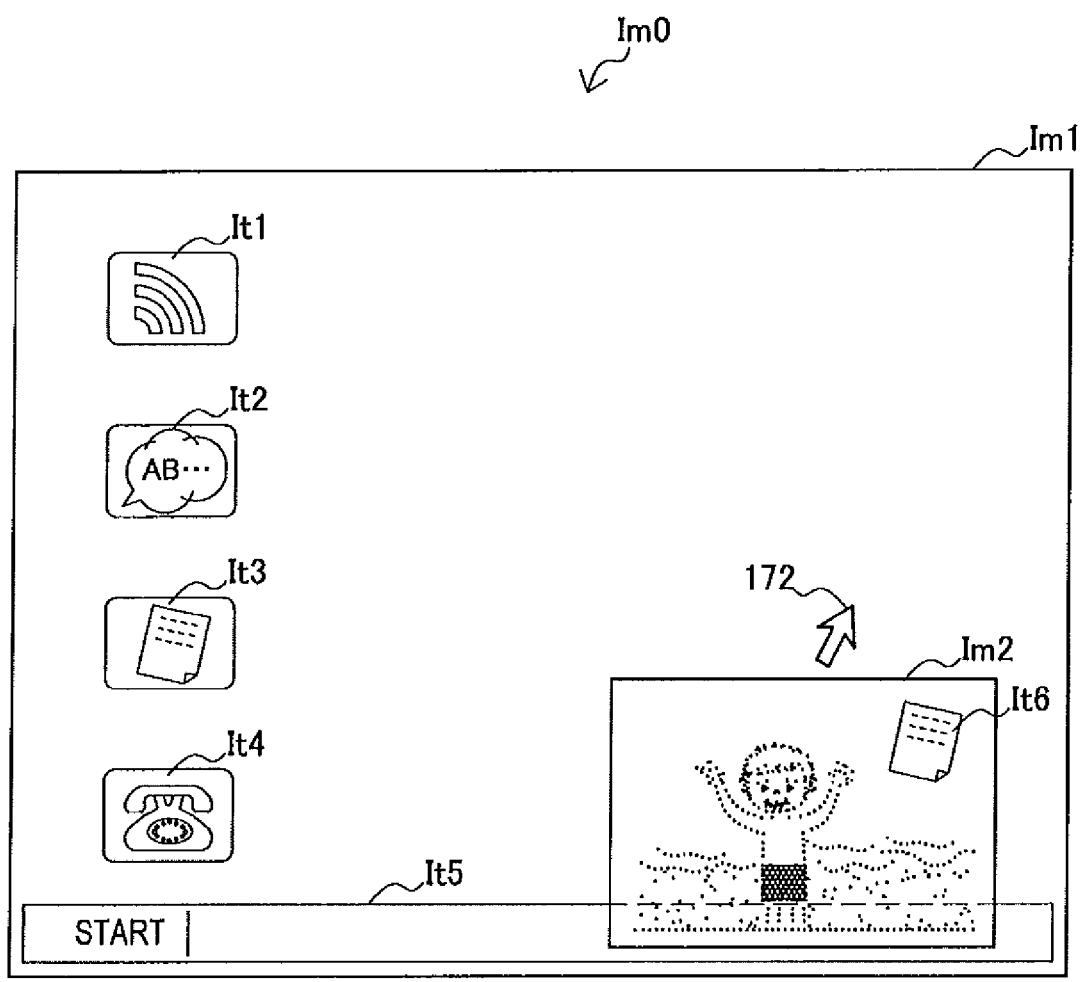
FIG. 8 is an illustrative diagram for illustrating an example of the output image in a first scenario.

FIG. 8 is an illustrative diagram for illustrating an example of the output image in the first scenario.

With reference to FIG. 8, the output image Im0 obtained by superimposing the second image Im2 on the first image Im1 as in the case in FIG. 5 is illustrated. However, in the example in FIG. 8, the cursor 172 moves closer to the second image Im2, and according to this, the second image Im2 is transparent. As a result, the icon It6 of the first image Im1 hidden behind the second image Im2 may be visually recognized.

The user may activate an application associated with the icon It6, for example, by further moving the cursor 172 on the icon It6 to click the icon It6. Also, when the user moves the cursor 172 away from the second image Im2, the second image Im2 is not transparent as in the example in FIG. 5. Therefore, when the user wants to watch the second image Im2 and also when the user wants to operate the first image Im1, a display state of the second image Im2 in the output image Im0 may be appropriately changed by simple operation to only move the cursor 172.

Figure 9:
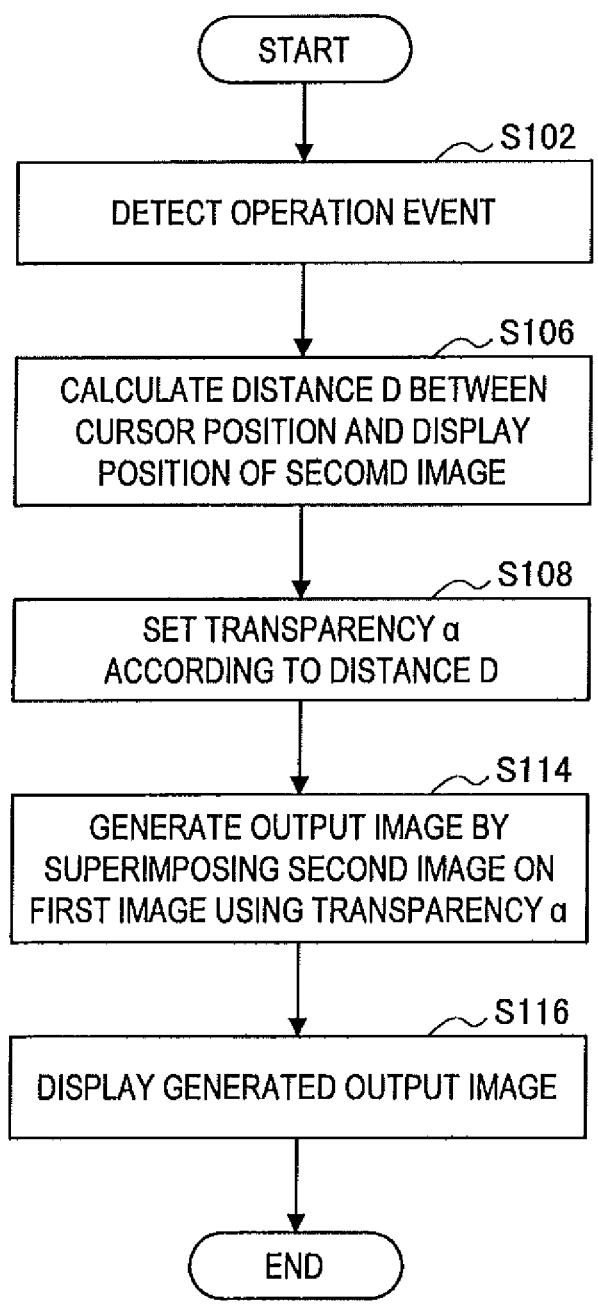
FIG. 9 is a flowchart of an example of a flow of a process by the image display device in the first scenario.

FIG. 9 is a flowchart of an example of a flow of a process by the image display device 100 in this scenario.

With reference to FIG. 9, the detecting unit 170 of the image display device 100 first detects the operation event Ev transmitted from the control device 200 (step S102). Next, the reproduction controller 180 calculates the distance D between the cursor position (positional coordinate included in the event information of the operation event Ev) and the display position of the second image (step S106). Next, the reproduction controller 180 refers to the transparency decision graph G1 or G2 illustrated in FIG. 7, for example, and sets the transparency α of the second image according to the distance D calculated at the step S106 (step S108). Next, the reproducing unit 160 generates the output image by superimposing the second image on the first image using the transparency α (step S114). Then, the reproducing unit 160 displays the generated output image on the screen 102 (step S116).

3-3. Variation

In the above-described first scenario, the user does not operate the second image using the cursor. That is to say, even when the cursor is present in the region in which the second image is displayed, it is the object on the first image behind the second image, which is a target of the operation using the cursor by the user. On the other hand, one method for enabling the operation of the second image using the cursor is to provide the menu to switch on/off display control such as the first scenario. That is to say, when the display control such as the first scenario is turned on, the object on the first image behind the second image may be operated. Also, when the display control is turned off, the second image may be operated. However, for the user, it is preferable that both of the desired two types of operation may be performed simply without such setting in advance. Therefore, a variation of the first scenario for solving such an issue is hereinafter described.

In this variation, the detecting unit 170 is further capable of detecting the user input different from the movement of the cursor. The user input different from the movement of the cursor may be the press, the release and the like of any button (such as a Ctrl key or a Shift key of the keyboard 204) provided on the pointing device 202 or the keyboard 204, for example. Such user input also is detected by the control device 200 to be transmitted from the control device 200 to the image display device 100 as the operation event Ev. The detecting unit 170 monitors the operation event Ev transmitted in this manner and may detect that a predetermined button is pressed or released by the code included in the event information of the operation event Ev.

The reproduction controller 180 switches on/off the display control such as the first scenario according to whether the above-described user input is detected. That is to say, for example, the reproduction controller 180 makes the second image transparent according to the cursor position ("on" state) when the operation event Ev indicating the movement of the cursor is detected in a state in which the predetermined button is not pressed. Also, the reproduction controller 180 does not make the second image transparent regardless of the cursor position ("off" state) when the operation event Ev indicating the movement of the cursor is detected in a state in which the predetermined button is pressed.

Figure 10:
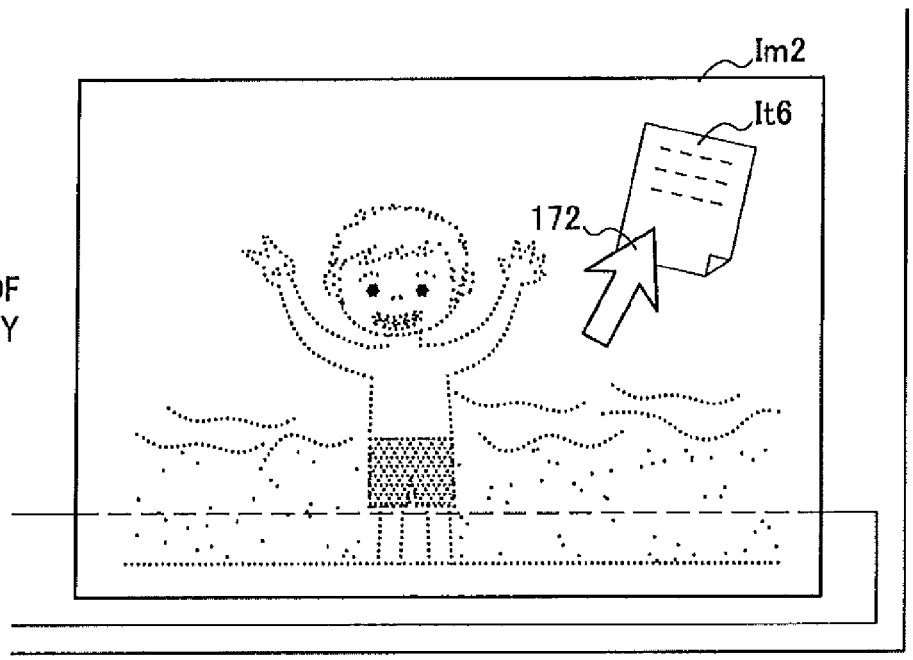
FIG. 10 is a first illustrative diagram for illustrating a variation of the first scenario.
Figure 11:
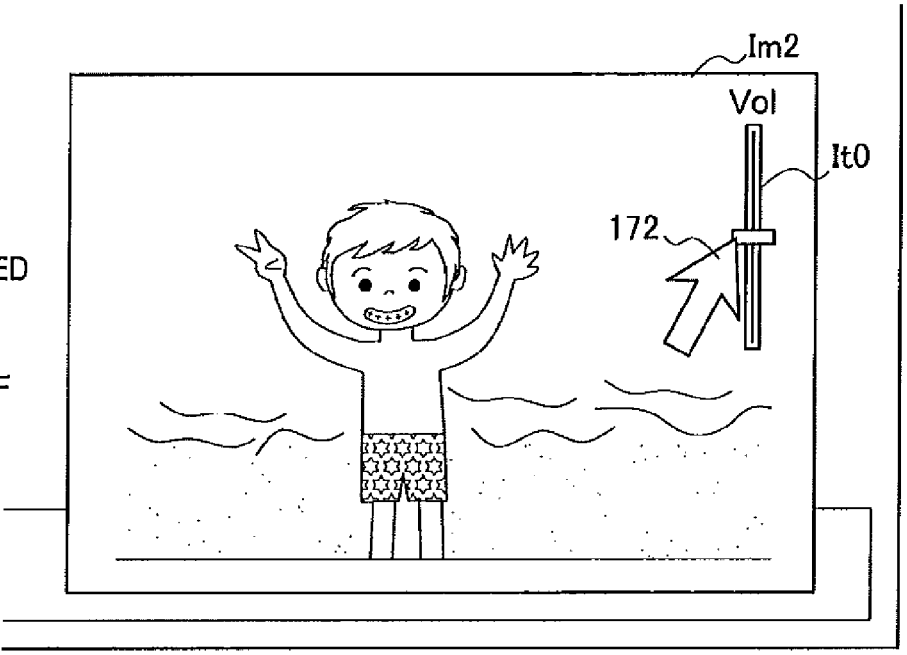
FIG. 11 is a second illustrative diagram for illustrating the variation of the first scenario.

FIGS. 10 and 11 are illustrative diagrams for illustrating an example of the output image in this variation. FIGS. 10 and 11 illustrate a portion in which the second image Im2 is displayed out of the output image in an enlarged manner.

FIG. 10 is the example of the output image when only the operation event Ev indicating the movement of the cursor is detected. In the example in FIG. 10, the cursor 172 is displayed on a position overlapped with the second image Im2. Also, as a result that the second image Im2 is transparent, the icon It6 of the first image Im1 hidden behind the second image Im2 may be visually recognized. Therefore, the user may activate the application associated with the icon It6, for example, by clicking the icon It6.

On the other hand, FIG. 11 illustrates the example of the output image when the operation event Ev indicating the movement of the cursor and the operation event Ev indicating the press of the predetermined button are detected. In the example in FIG. 11, the cursor 172 is displayed on the position overlapped with the second image Im2. Also, the second image Im2 is not transparent and the object of the first image Im1 hidden behind the second image Im2 is not visually recognized. In such a state, the user may operate a volume control bar It0 (bar for controlling a volume of the audio reproduced in association with the second image), which is the object on the second image, for example. Also, the operation of the second image is not limited to such an example and may be change of the size or movement of the second image, for example.

According to the configuration according to this variation, it becomes possible that the user easily and selectively operates any of the objects on the second image or on the first image behind the second image without setting on/off of the display control in advance.

Figure 12:
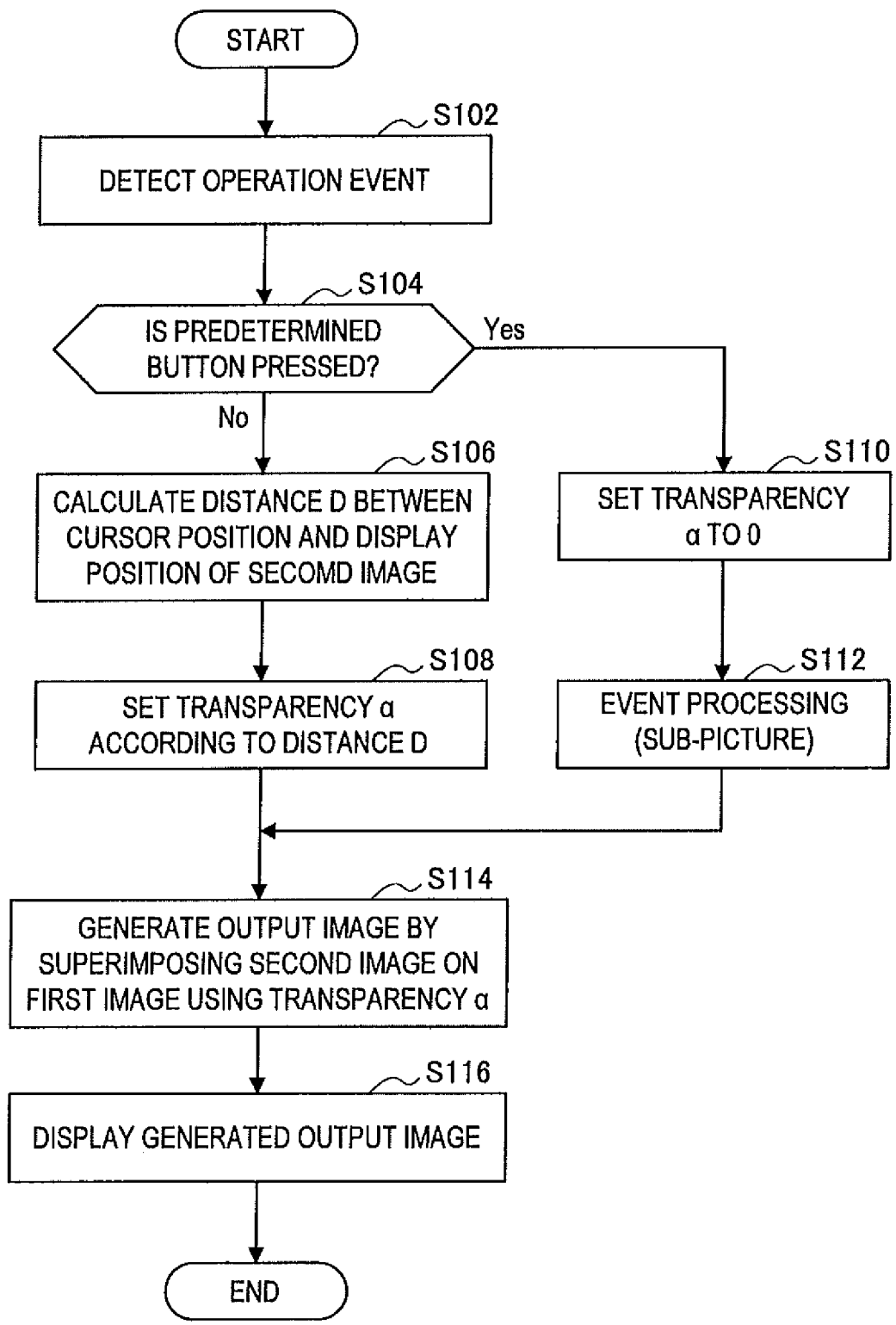
FIG. 12 is a flowchart of an example of a flow of a process by the image display device in the variation of the first scenario.

FIG. 12 is a flowchart of an example of a flow of a process by the image display device 100 in this variation.

With reference to FIG. 12, the detecting unit 170 of the image display device 100 first detects the operation event Ev indicating the movement of the cursor (step S102). Next, the reproduction controller 180 judges whether the predetermined button (for example, the Ctrl key or the Shift key of the keyboard 204) is pressed at that time (step S104). Herein, when it is judged that the predetermined button is pressed (for example, when the button is pressed and is not yet released), the procedure shifts to a step S110. On the other hand, when it is judged that the predetermined button is not pressed, the procedure shifts to the step S106.

At the step S106, the reproduction controller 180 calculates the distance D between the cursor position and the display position of the second image (step S106). Next, the reproduction controller 180 refers to the transparency decision graph G1 or G2 illustrated in FIG. 7, for example, and sets the transparency α of the second image according to the distance D calculated at the step S106 (step S108).

On the other hand, at the step S110, the reproduction controller 180 sets the transparency α of the second image to 0 (step S110). Next, the reproduction controller 180 performs event processing according to the operation event (step S112). The event processing here corresponds to change of the volume or the change of the size or the position of the second image, for example.

Next, the reproducing unit 160 generates the output image by superimposing the second image obtained by the second obtaining unit 150 on the first image obtained by the first obtaining unit 140 using the transparency α (step S114). Meanwhile, when it is judged that the predetermined button is pressed at the step S104, the transparency α is set to 0 at the step S110, so that the second image is not substantially transparent. Then, the reproducing unit 160 displays the generated output image on the screen 102 (step S116).

Figure 13:
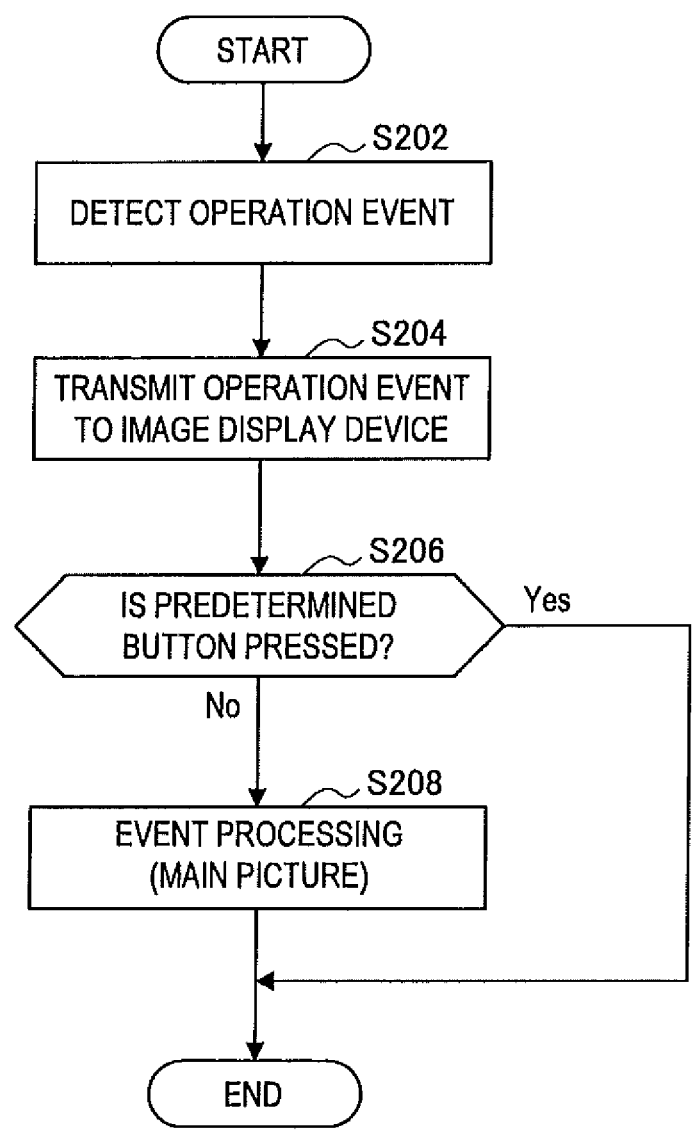
FIG. 13 is a flowchart of an example of a flow of a process by the control device in the variation of the first scenario.

FIG. 13 is a flowchart illustrating an example of a flow of a process by the control device 200 in this variation.

With reference to FIG. 13, the control device 200 first detects the operation event generated in the pointing device 202 or the keyboard 204 (step S202). Next, the control device 200 transmits the detected operation event to the image display device 100 (step S204). Also, the control device 200 judges whether the above-described predetermined button is pressed at that time (step S206). Herein, when it is judged that the predetermined button is not pressed, the control device 200 performs the event processing according to the operation event (step S208). The event processing here corresponds to activation of the application associated with a pointed icon or opening of a file or execution of a pointed menu, for example. On the other hand, when it is judged that the predetermined button is pressed at the step S206, the image display device 100 performs the event processing for the sub-picture, so that the event processing for the main picture by the control device 200 is not performed.

Meanwhile, although the example in which the display control such as the first scenario is turned on when the predetermined button is not pressed is mainly described herein, of course, the display control may be turned on when the predetermined button is pressed.

3-4. Second Scenario

In a second scenario, the reproduction controller 180 moves the second image to another position in the output image when the distance D between the display position of the second image and the cursor position is 0 or smaller than the predetermined threshold. More specifically, the reproduction controller 180 moves the display position of the second image from the position so far to another position when the distance D between the display position of the second image and the cursor position becomes smaller than the predetermined threshold (for example, 20 pixels), for example. A destination of the second image may be an optional position distant from a newest cursor position such as an opposite position across a horizontal line on a center in a vertical direction of the output image, for example.

Figure 14:
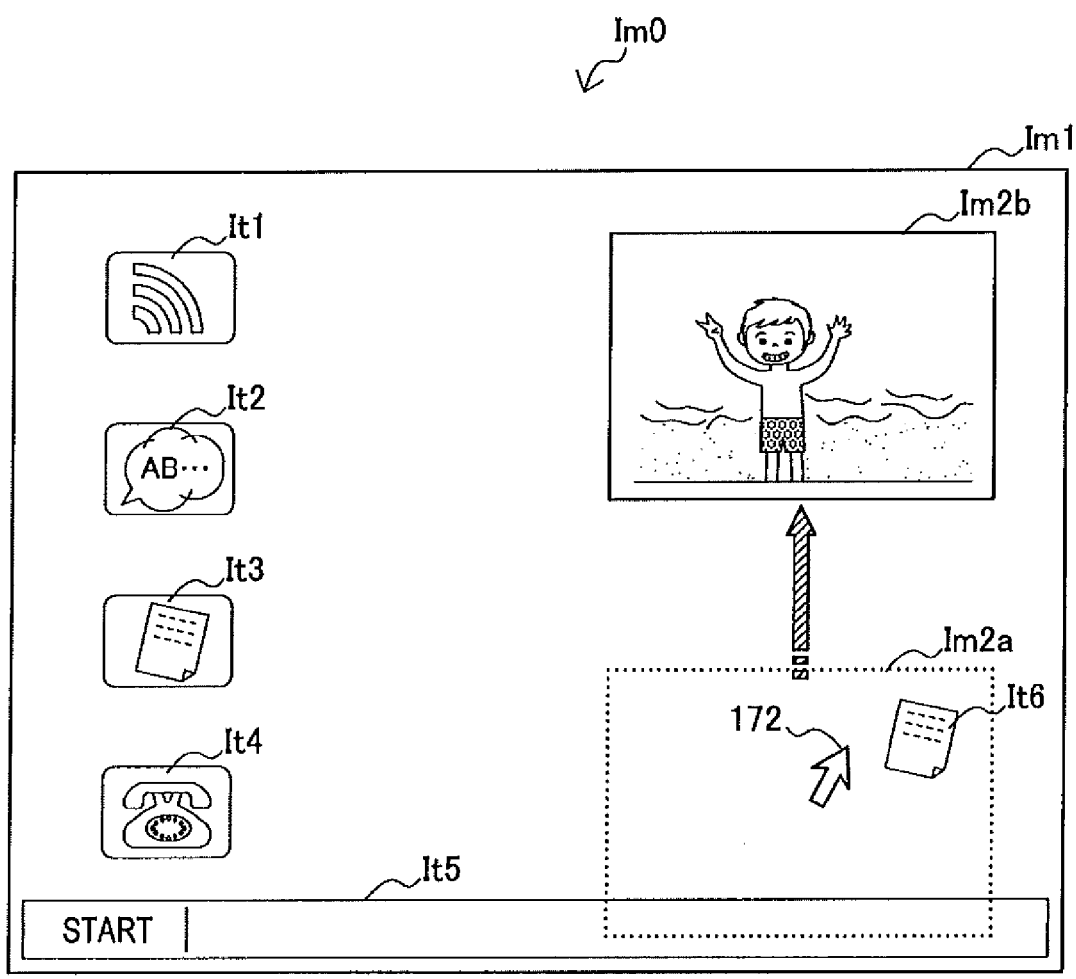
FIG. 14 is an illustrative diagram for illustrating an example of the output image in a second scenario.

FIG. 14 is an illustrative diagram for illustrating an example of the output image in the second scenario.

With reference to FIG. 14, the output image Im0 obtained by superimposing a second image Im2b on the first image Im1 is illustrated. Since the cursor 172 moves closer, the display position of the second image Im2b moves upward from an original position Im2a. As a result, the icon It6 of the first image Im1 hidden behind the second image may be visually recognized.

The user may activate the application associated with the icon It6, for example, by further moving the cursor 172 on the icon It6 to click the icon It6.

Figure 15:
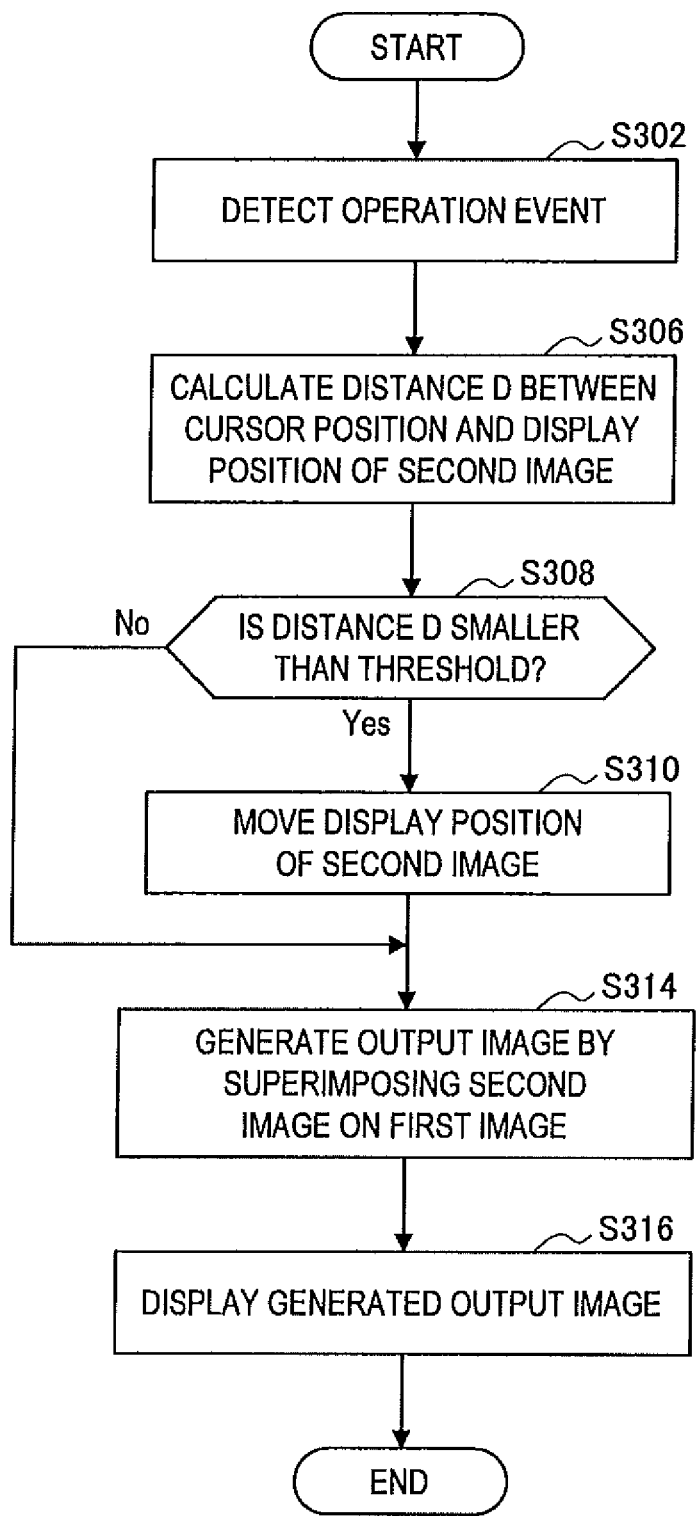
FIG. 15 is a flowchart of an example of a flow of a process by the image display device in the second scenario.

FIG. 15 is a flowchart of an example of a flow of a process by the image display device 100 in this scenario.

With reference to FIG. 15, the detecting unit 170 of the image display device 100 first detects the operation event Ev transmitted from the control device 200 (step S302). Next, the reproduction controller 180 calculates the distance D between the cursor position and the display position of the second image (step S306). Next, the reproduction controller 180 judges whether the distance D calculated at the step S306 is smaller than the predetermined threshold (step S308). Then, the reproduction controller 180 moves the display position of the second image when the distance D is smaller than the predetermined threshold (step S310). On the other hand, when the distance D is not smaller than the predetermined threshold, the reproduction controller 180 does not move the display position of the second image. Next, the reproducing unit 160 generates the output image by superimposing the second image on the first image on the display position specified by the reproduction controller 180 (step S314). Then, the reproducing unit 160 displays the generated output image on the screen 102 (step S316).

Meanwhile, although not illustrated in FIG. 15, the above-described variation of the first scenario may be combined with this scenario. That is to say, the reproduction controller 180 may switch on/off of the control of the display position of the second image according to presence or absence of the press of the predetermined button.

Also, the reproduction controller 180 may calculate a time change amount of the distance D and judge whether to move the display position of the second image further based on the calculated time change amount, for example. For example, when the distance D is smaller than the first threshold (for example, 20 pixels) and when the time change amount of the distance D is larger than a second threshold (for example, −5 pixels per frame), the reproduction controller 180 moves the display position of the second image. In such a configuration, the user may move the display position of the second image to another position by simple operation to quickly move the cursor closer to the second image, and may move the cursor closer to the second image (by moving the second image slowly) also when the second image is not wanted to be moved, for example.

3-5. Third Scenario

In a third scenario, the reproduction controller 180 controls the reproduction of the audio signal by the reproducing unit 160 according to the positional relationship between the display position of the second image and the cursor position. More specifically, the reproduction controller 180 does not allow the reproducing unit 160 to reproduce the audio signal associated with the second image when the distance D between the display position of the second image and the cursor position is larger than the predetermined threshold, for example. Also, the reproduction controller 180 increases the volume of the audio signal associated with the second image reproduced by the reproducing unit 160 as the distance D is smaller when the distance D between the display position of the second image and the cursor position is smaller than the predetermined threshold, for example.

Figure 16:
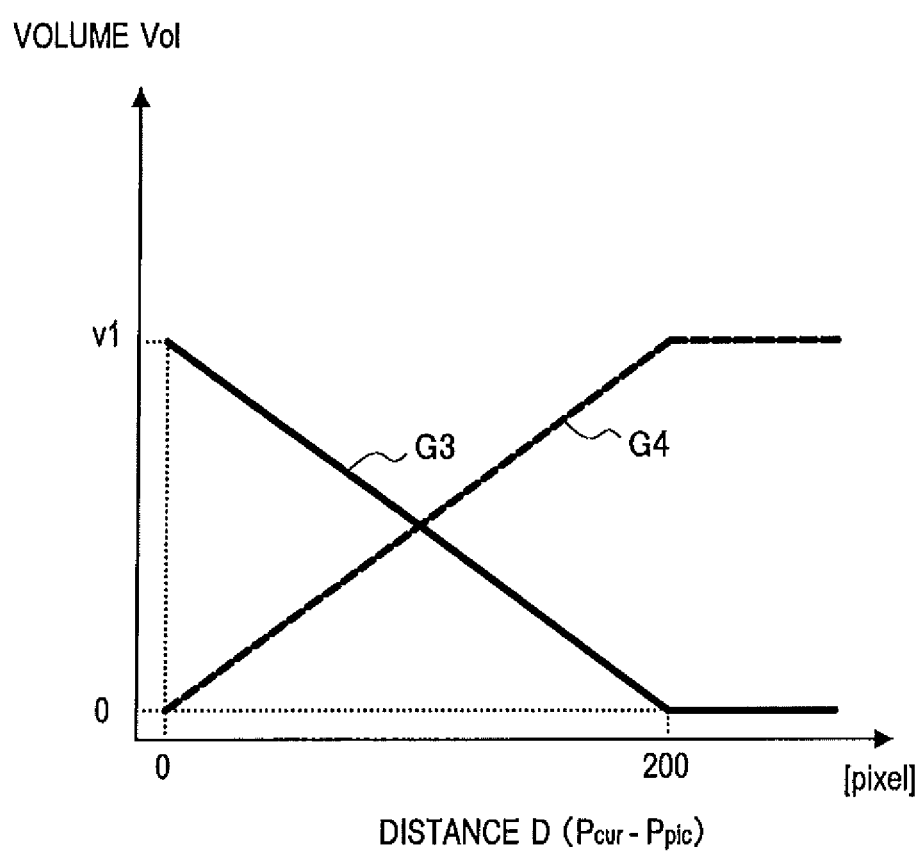
FIG. 16 is an illustrative diagram for illustrating a volume according to the distance between the display position of the second image and the cursor position.

FIG. 16 is an illustrative diagram for illustrating the volume according to the distance between the display position of the second image and the cursor position. With reference to FIG. 16, a volume decision graph G3 as an example in which the distance D is represented along the abscissa axis and a volume Vol of the audio signal associated with the second image is represented along the longitudinal axis is illustrated.

According to the graph G3, when the distance D=0, the volume Vol=v1 and when the distance D=200, the volume Vol=0. While the distance D changes from 0 to 200, the volume Vol linearly decreases from v1 to 0. When the distance D is larger than 200, the volume Vol is typically 0. Meanwhile, the volume decision graph G3 illustrated in FIG. 16 is illustrative only. That is to say, the reproduction controller 180 may set the volume Vol according to the distance D in accordance with another threshold, another inclination of the volume or another volume decision graph. Also, the image display device 100 may allow the user to set the volume decision graph in advance.

Also, a graph G4 indicated by a broken line in FIG. 16 is a volume decision graph in which the volume Vol of the audio signal associated with the first image is represented along the longitudinal axis. According to the graph G4, when the distance D=0, the volume Vol=0 and when the distance D=200, the volume Vol=v1. While the distance D changes from 0 to 200, the volume Vol linearly increases from 0 to v1. When the distance D is larger than 200, the volume Vol is typically v1. For example, when the audio signal associated with the first image is obtained by the first obtaining unit 140, the reproduction controller 180 may decide the volume of the two audio signals according to the distance D in accordance with the volume decision graphs G3 and G4 and reproduce the audio signals by superimposing them at the decided volume. Also, the reproduction controller 180 may simply switch the reproduction of the two audio signals according to a result of comparison of the distance D with the threshold.

By such control of the volume, the user may recognize the positional relationship between the display position of the second image and the cursor position by means of not only vision but also audition. According to this, the user may control the display by operating the cursor more easily. Also, the user may switch the audio input or change balance of the volume by the simple operation to only move the cursor.

Figure 17:
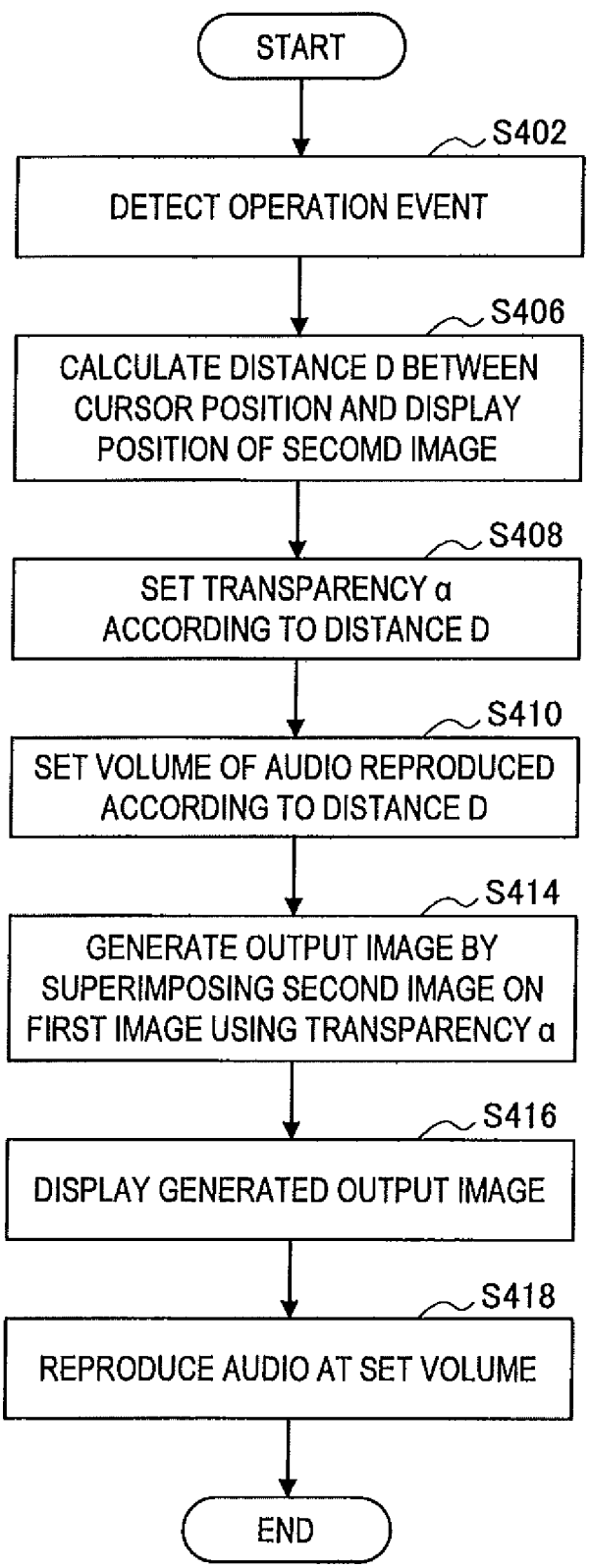
FIG. 17 is a flowchart of an example of a flow of a process by the image display device in a third scenario.

FIG. 17 is a flowchart of an example of a flow of a process by the image display device 100 in this scenario. Meanwhile, herein, an example in which the control of the transparency by the first scenario and the control of the volume by the above-described third scenario are combined is described.

With reference to FIG. 17, the detecting unit 170 of the image display device 100 first detects the operation event Ev transmitted from the control device 200 (step S402). Next, the reproduction controller 180 calculates the distance D between the cursor position and the display position of the second image (step S406). Next, the reproduction controller 180 refers to the transparency decision graph G1 or G2 illustrated in FIG. 7, for example, and sets the transparency α of the second image according to the distance D calculated at the step S406 (step S408). Next, the reproduction controller 180 refers to the volume decision graph G3 illustrated in FIG. 16, for example, and sets the volume Vol when reproducing the audio signal associated with the second image according to the distance D calculated at the step S406 (step S410). Next, the reproducing unit 160 generates the output image by superimposing the second image on the first image using the transparency α (step S414). Then, the reproducing unit 160 displays the generated output image on the screen 102 (step S416). Also, the reproducing unit 160 reproduces the audio signal associated with the second image using the speaker 128 at the volume set at the step S410 (step S418).

4. Summary

Heretofore, the display control system 1, the image display device 100, and the control device 200 according to one embodiment of the present disclosure are described with reference to FIGS. 1 to 17. According to this embodiment, the image display device 100 detects the position in the output image of the cursor operated by the user and controls the transparency or the display position of the second image according to the positional relationship between the display position of the second image, which forms the sub-picture in the PinP, and the detected cursor position. According to this, the user may find the object on the first image hidden behind the second image, for example, by only the simple operation to move the cursor and operate the object Therefore, operability by the user in the composite screen display such as the PinP is further improved.

Also, according to this embodiment, the positional relationship between the display position of the second image and the cursor position is indicated by the distance between the display position of the second image and the cursor position. Therefore, the image display device 100 controls the transparency or the display position of the second image according to the distance between the display position of the second image and the cursor position. According to this, the control in which the first image behind the second image may be visually recognized when the user moves the cursor closer to the second image becomes possible. Also, as the distance becomes smaller, the transparency of the second image is increased or the volume of the audio reproduced in association with the second image is increased, so that the positional relationship between the display position of the second image and the cursor position may be recognized by the user more easily and the operation by the user is supported more successfully.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-141453 filed in the Japan Patent Office on Jun. 22, 2010, the entire content of which is hereby incorporated by reference.

What is claimed is:

1. An image display device, comprising:
   a first obtaining unit to obtain a first image;
   a second obtaining unit to obtain a second image to be superimposed on the first image;
   a reproducing unit to generate an output image by superimposing the second image on the first image and display the generated output image;
   a detecting unit to detect a first operation event and only upon detection of the first operation event to determine whether a second operation event has occurred after the first operation event and does not correspond to the same operation as the first operation event, said first operation event includes a code indicative of a type of operation and information indicative of a position in the output image of a cursor operated by a user; and
   a reproduction controller to control display of the second image by the reproducing unit according to positional relationship between a display position of the second image in the output image and a cursor position detected by the detecting unit,
   in which the reproduction controller (i) enables the user to set a desired relationship between transparency of the second image and distance between the display position of the second image and the cursor position, (ii) changes transparency of the second image according to the distance between the display position of the second image and the cursor position based on the set desired relationship when the first operation event is detected and the second operation event is determined not to have occurred, (iii) does not make the second image transparent when the first operation event is detected and the second operation event is determined to have occurred after the first operation event, (iv) enables the user to perform operations on the second image when the first operation event is detected and the second operation event is determined to have occurred after the first operation event; and (v) automatically moves, in a direction across the output image, the second image from an original position to another position in the output image, when the first operation event indicating a movement type of operation is detected and the distance between the display position of the second image and the cursor position is 0 or smaller than a predetermined threshold.

2. The image display device according to claim 1, wherein the second obtaining unit further obtains an audio signal associated with the second image,
   the reproducing unit reproduces the audio signal obtained by the second obtaining unit, and
   the reproduction controller further controls reproduction of the audio signal by the reproducing unit according to the positional relationship.

3. The image display device according to claim 2,
   wherein the reproduction controller does not allow the reproducing unit to reproduce the audio signal when a distance between the display position of the second image and the cursor position is larger than a predetermined threshold.

4. A display controlling method for use with an image display device, said method comprising:
   obtaining a first image;
   obtaining a second image to be superimposed on the first image;
   generating an output image by superimposing the second image on the first image;
   displaying the generated output image on a display screen of the image display device;
   detecting a first operation event and only upon detection of the first operation event for determining whether a second operation event has occurred after the first operation event and does not correspond to the same operation as the first operation event, said first operation event includes a code indicative of a type of operation and information indicative of a position in the output image of a cursor operated by a user; and
   controlling display of the second image in the output image according to positional relationship between a display position of the second image in the output image and a detected cursor position; and
   enabling the user to set a desired relationship between transparency of the second image and the distance between the display position of the second image and the cursor position,
   in which the controlling (i) changes transparency of the second image according to distance between the display position of the second image and the cursor position based on the set desired relationship when the first operation event is detected and the second operation event is determined not to have occurred, (ii) does not make the second image transparent when the first operation event is detected and the second operation event is determined to have occurred after the first operation event, (iii) enables the user to perform operations on the second image when the first operation event is detected and the second operation event is determined to have occurred after the first operation event, and (v) automatically moves, in a direction across the output image, the second image from an original position to another position in the output image, when the first operation event indicating a movement type of operation is detected and the distance between the display position of the second image and the cursor position is 0 or smaller than a predetermined threshold.

5. A non-transitory computer readable memory having stored thereon a program for allowing a computer for controlling an image display device for displaying an output image generated by superimposing a second image on a first image to serve as:
   a first obtaining unit to obtain the first image;
   a second obtaining unit to obtain the second image;
   a detecting unit to detect a first operation event and only upon detection of the first operation event to determine whether a second operation event has occurred after the first operation event and does not correspond to the same operation as the first operation event, said first operation event includes a code indicative of a type of operation and information indicative of a position in the output image of a cursor operated by a user; and a reproduction controller to control display of the second image in the output image according to positional relationship between a display position of the second image in the output image and a cursor position detected by the detecting unit, in which the reproduction controller (i) enables the user to set a desired relationship between transparency of the second image and distance between the display position of the second image and the cursor position, (ii) changes transparency of the second image according to the distance between the display position of the second image and the cursor position based on the set desired relationship when the first operation event is detected and the second operation event is determined not to have occurred, (iii) does not make the second image transparent when the first operation event is detected and the second operation event is determined to have occurred after the first operation event, (iv) enables the user to perform operations on the second image when the first operation event is detected and the second operation event is determined to have occurred after the first operation event, and (v) automatically moves, in a direction across the output image, the second image from an original position to another position in the output image, when the first operation event indicating a movement type of operation is detected and the distance between the display position of the second image and the cursor position is 0 or smaller than a predetermined threshold.

6. The image display device according to claim 1, in which the second operation event includes activation of a predetermined button.

7. The image display device according to claim 1, in which the second operation event includes non-activation of a predetermined button.

8. The image display device according to claim 1, in which the code is selected from among a number of codes which include at least a movement code indicative of a movement of the cursor.

9. The display controlling method according to claim 4, in which the second operation event includes activation of a predetermined button.

10. The display controlling method according to claim 4, in which the second operation event includes non-activation of a predetermined button.

11. The display controlling method according to claim 4, in which the code is selected from among a number of codes which include at least a movement code indicative of a movement of the cursor.

12. The display controlling method according to claim 5, in which the second operation event includes activation of a predetermined button.

13. The display controlling method according to claim 5, in which the second operation event includes non-activation of a predetermined button.

14. The display controlling method according to claim 5, in which the code is selected from among a number of codes which include at least a movement code indicative of a movement of the cursor.

\* \* \* \* \*